(12) United States Patent
Tynys et al.

(10) Patent No.: US 10,087,575 B2
(45) Date of Patent: Oct. 2, 2018

(54) BREATHABLE NONWOVEN COMPOSITE

(75) Inventors: Antti Tynys, Linz (AU); Philippe Gilles, Rognes (FR); Joachim Fiebig, St. Marien (AU); Henk Van Paridon, Averbode (BE); Bert Broeders, Beringen (BE); Wilhelmus Henricus Adolf Sars, CA Tilburg (NL); Nina Ackermans, Tessenderlo (BE)

(73) Assignee: BOREALIS AG (AT)

( * ) Notice: Subject to any disclaimer, the term of this patent is extended or adjusted under 35 U.S.C. 154(b) by 0 days.

(21) Appl. No.: 13/699,327

(22) PCT Filed: May 23, 2011

(86) PCT No.: PCT/EP2011/058359
§ 371 (c)(1),
(2), (4) Date: Feb. 11, 2013

(87) PCT Pub. No.: WO2011/147773
PCT Pub. Date: Dec. 1, 2011

(65) Prior Publication Data
US 2013/0210304 A1      Aug. 15, 2013

(30) Foreign Application Priority Data
May 25, 2010   (EP) .................................... 10163763

(51) Int. Cl.
*D06N 3/04*       (2006.01)
*D06N 3/00*       (2006.01)
(Continued)

(52) U.S. Cl.
CPC ............. *D06N 3/045* (2013.01); *B32B 5/022* (2013.01); *B32B 27/12* (2013.01); *B32B 27/32* (2013.01);
(Continued)

(58) Field of Classification Search
CPC .... D06N 3/045; D06N 3/0011; D06N 3/0038; D06N 3/0036; D06N 3/0034;
(Continued)

(56) References Cited

U.S. PATENT DOCUMENTS 5,234,879 A    8/1993    Garoff et al.
6,120,887 A    9/2000    Werenicz et al.
(Continued)

FOREIGN PATENT DOCUMENTS

EP    0 629 632 B1    3/1995
EP    0787750 A2  *  8/1997    ................ C08F 8/00
(Continued)

OTHER PUBLICATIONS

Naguib, H., Strategies for Achieving Fine-celled Low-Density Polypropylene Foams, Blowing Agents and Foaming Processes, 2001, Rapra Techology Limited.*
(Continued)

*Primary Examiner* — Frank J Vineis
(74) *Attorney, Agent, or Firm* — Tarolli, Sundheim, Covell & Tummino LLP

(57) ABSTRACT

Coated nonwoven fabric comprising a nonwoven fabric layer and a coating, said coating comprises a polymer having a branching index g' of equal or below 0.9.

11 Claims, 1 Drawing Sheet

Coated side (SEM, x500) of example 2

(51) Int. Cl.
 *B32B 27/32* (2006.01)
 *B32B 27/12* (2006.01)
 *B32B 5/02* (2006.01)

(52) U.S. Cl.
 CPC ......... *D06N 3/0011* (2013.01); *D06N 3/0034* (2013.01); *D06N 3/0036* (2013.01); *D06N 3/0038* (2013.01); *B32B 2262/0253* (2013.01); *B32B 2262/0261* (2013.01); *B32B 2262/0276* (2013.01); *B32B 2307/724* (2013.01); *B32B 2307/7265* (2013.01); *D06N 2209/123* (2013.01); *D06N 2209/128* (2013.01); *Y10T 442/2139* (2015.04)

(58) Field of Classification Search
 CPC ........ D06N 2209/123; D06N 2209/128; B32B 27/32; B32B 27/12; B32B 5/022; B32B 2262/0261; B32B 2262/0253; B32B 2307/7265; B32B 2307/724; B32B 2262/0276; Y10T 442/2139
 USPC .......................................................... 442/76
 See application file for complete search history.

(56) References Cited

U.S. PATENT DOCUMENTS

| | | | |
|---|---|---|---|
| 6,235,658 B1 | 5/2001 | Panzer et al. | |
| 6,300,257 B1 | 10/2001 | Kirchberger et al. | |
| 7,241,493 B2 | 7/2007 | Zhou | |
| 2002/0105110 A1* | 8/2002 | Dobrin et al. | 264/154 |
| 2004/0029469 A1 | 2/2004 | Anderson et al. | |
| 2008/0227877 A1* | 9/2008 | Stadlbauer et al. | 521/79 |
| 2009/0306281 A1* | 12/2009 | Tancrede et al. | 524/583 |

FOREIGN PATENT DOCUMENTS

| | | | | |
|---|---|---|---|---|
| EP | 0879830 A1 * | 11/1998 | | C08F 255/02 |
| EP | 0 887 379 A1 | 12/1998 | | |
| EP | 0890612 A2 * | 1/1999 | | C08L 23/10 |
| EP | 0955158 A2 * | 11/1999 | | B32B 27/12 |
| EP | 1375584 A1 | 1/2004 | | |
| EP | 1683631 A1 | 7/2006 | | |
| EP | 1892264 A1 | 2/2008 | | |
| EP | 2113541 A1 | 11/2009 | | |
| RU | 2419640 C2 * | 5/2011 | | C08F 10/00 |
| WO | 92/12182 A1 | 7/1992 | | |
| WO | 92/19653 A1 | 11/1992 | | |
| WO | 92/19658 A1 | 11/1992 | | |
| WO | 99/33843 A1 | 7/1999 | | |
| WO | 2008/022803 A2 | 2/2008 | | |

OTHER PUBLICATIONS

Lee, Y., Process Property Studies of Meltblown Thermoplastic Polyurethane Polymers for Protective Apparel, International Nonwovens Journal, Winter 2005.*
Borealis Group, Solutions for extrusion coating applications, Borealis Group, archived Nov. 16, 2008, http://www.borealisgroup.com/pdf/literature/borealis-borouge/sds/K_IN0012_GB_FF_2007_10_BB.pdf.*
Borealis Group, Solutions for fibers, Borealis Group, archived Feb. 2, 2010, http://www.borealisgroup.com/pdf/literature/borealis-borouge/sds/K_IN0007_GB_FF_2007_10_BB.pdf.*
Kirchberger, M. New PP Resins for Extrusion Coating—The Move to Better Economics and Performance, Tappi Press, 2000.*
Encyclopedia of Polymer Science and Technology, John Wiley, vol. 2.,1965, pp. 412-441.*
Filipe, S., Non-Linear Rheology of Polymer Melts, Novel Trends in Rheology III—Proceedings of the International Conferences, 2009, pp. 168-174.*
Solutions for Extrusion Coating applications, Borealis and Borouge—leading, innovation plastics provider, 2007.
Hayashi, et al. "Heptad configurational analysis of 13C n.m.r. spectra in highly isotactic polypropylene", Polymer, 1988, vol. 29, Jan.
J.M. Dealy, et al., "Melt Rheology and its Role in Plastics Processing Theory and Applications", 1990.
Jackson, et al., "Molecular Weight Sensitive Detectors for Size Exclusion Chromatography", Handbook, 1995, pp. 103-145.
Rodriguez-Hernandez et al., "Determination of the Molecular Characteristics of Commercial Polyethylenes with Different Architectures and the Relation with the Melt Flow Index", Journal of Applied Polymer Science, vol. 104, 1572-1578, 2007.
Office Action for Russian Patent Application No. 2012155042/05(087296).
Filipe et al., "Proceeding of Annual European Rheology Conference", 135, 2010.
Saunders et al., "Use of Rapid Triple Detection Size Exclusion Chromatography to Evaluate the Evolution of Molar Mass and Branching Architecture during Free Radical Branching Copolymerization of Methyl Methacrylate and Ethylene Glycol Dimethacrylate", Macromolecules 2005, 38, pp. 6418-6422.
Manfred Wilhelm, "Fourier-Transform Rheology", Macromolecular Materials Engineering 287, pp. 83-105, 2002.
Office Action for Chinese Patent Application No. 201180025534.4.
Brandolini et al., "NMR Spectra of Polymers and Polymer Additives", Mobil Chemical Company, Copyright © 2000 by Marcel Dekker, Inc.
M.H. Wagner, "Rheotens-Mastercurves and Drawability of Polymer Melts", Polymer Engineering and Science, Mid-Apr. 1996, vol. 36, No. 7.
ZIMM et al., "The Dimensions of Chain Molecules Containing Branches and Rings", The Journal of Chemical Physics, vol. 17, Dec. 12, 1949.
Baumgaertel et al., "Determination of discrete relaxation and retardation time spectra from dynamic mechanical data", Rheologica Acta, 28:511-519, 1989.
Berger et al., "200 and More NMR Experiments", A Practical Course, Wiley-VCH, 2004.
Chujo et al., "Two-site model analysis of 13C n.m.r, of polypropylene polymerized by Ziegler-Natta catalyst with external alkoxysilane donors", Polymer, 1994, vol. 35, No. 2, pp. 339-342.
Selim Bensason, "Experimental Report", pp. 1-4, 2014.
Russell et al., Handbook of nonwovens, pp. 385-389, 2007.
Technical Information—Extrusion Coating Resin, PE PT 7007, Polyethylene Resin for Extrusion Coated Packaging, DOW.
Technical Information, DOW™ Lope PT 7007, Low Density Polyethylene Resin, DOW.
Poly Print: Water Vapor Transmission Rate, http://www.polyprint.com/flexographic-wvtr.htm.
John M. Dealy, "Melt Rheology and its Role in Plastics Processing", pp. 240-258 1995.
Gabriel et al., "Strain hardening of various polyolefins in uniaxial elongational flow", Rheol. 47(3), 619-630, May/Jun. 2003.
Shingo Kouda, "Prediction of Processability at Extrusion Coating for Low-Density Polyethylene", Engineering and Science—2008, pp. 1094-1102.

* cited by examiner

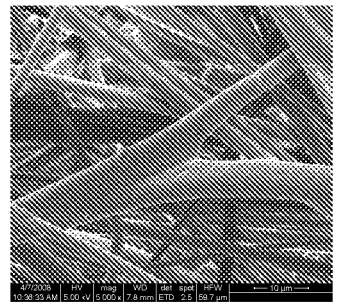
Figure 1: Non coated side of example 2
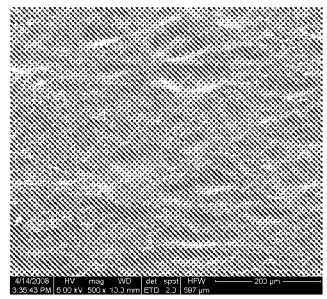
Figure 2: Coated side (SEM, x500) of example 2
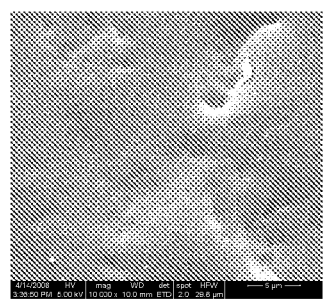
Figure 3: Coated side (SEM, x10000) of example 2

BREATHABLE NONWOVEN COMPOSITE

This application is a National Phase Filing of PCT/EP2011/058359, filed May 23, 2011, which claims priority from European Application No. 10163763.5, filed May 25, 2010, the subject matter of which are incorporated herein by reference in their entirety.

The present invention is directed to a new composite comprising a nonwoven fabric as substrate and a new coating layer thereon.

The nonwoven fabric is a fabric-like material made from long fibers, bonded together by chemical, mechanical, heat or solvent treatment.

Nonwoven fabrics typically have good moisture vapor permeability but moderate barrier properties. However in many application areas (i.e. hygiene) a breathable material (good vapor permeability) having good liquid barrier properties is needed. Today's solutions are based on a laminate of a breathable film and a nonwoven fabric. These systems are for example used for protective clothing and diaper back sheet.

US 2004/0029469 A1 describes a composite consisting of a nonwoven substrate and a extrusion coated polymer film, wherein the film has micro-pores. However one disadvantage of the composite is the weight of the film needed to obtain the desired barrier properties.

U.S. Pat. No. 6,235,658 uses high amounts of filler material to obtain a composite structure with acceptable breathability. This requires costly drying steps in the preparation and bears the risk of macro-pore formation in stretching, limiting the liquid barrier quality.

A disadvantage of these systems is the complicated process for production (cost) and the limited breathability causing poor comfort of wear in protective clothing as an example.

Thus the object of the present invention is to provide a composite combining good breathability with good barrier properties. Further these properties shall be obtained in a cost efficient way.

BRIEF DESCRIPTION OF THE DRAWINGS

FIG. 1 illustrates the non coated side of example 2.

FIG. 2 illustrates the coated side (SEM, ×500) of example 2.

FIG. 3 illustrates the coated side (SEM, ×10000) of example 2.

The finding of the present invention is that the nonwoven fabric must be coated with a very thin layer of polymer being of branched chain structure and showing high melt strength. Another finding is that the composite does not need to be not stretched to obtain the desired properties.

Accordingly in a first aspect the present invention is directed to a composite comprising
(a) a nonwoven fabric (NF) being the substrate of the composite, said nonwoven fabric (NF) comprises a polymer (P-1) selected from the group consisting of polyethylene (PE-1), polypropylene (PP-1), polyethylene terephthalate (PET) and polyamide (PA), and
(b) a coating layer (CL) overlaying at least one surface of the nonwoven fabric (NF), said coating layer (CL) comprises a polymer (P-2) being either a polypropylene (PP-2) or a polyethylene (PE-2), wherein the coating layer (CL) and/or the polymer (P-2) has (have)
(i) a branching index g' of equal or below 0.9, and/or
(ii) a strain hardening factor (SHF) measured at a strain rate of 3.0 s-1 and a Hencky strain of 2.5 of at least 2.0.

Preferably the coating layer (CL) and/or the polymer (P-2) according to the first aspect has (have)
(a) a strain hardening factor (SHF) measured at a strain rate of 1.0 $s^{-1}$ and a Hencky strain of 2.0 of at least 1.5, and/or
(b) a LAOS non-linearity factor (LAOS-NLF) measured according to the LAOS method of at least 2.5, and/or
(c) a $F_{30}$ melt strength of at least 3.0 cN at 200° C. determined by the Rheotens test.

In a second aspect the present invention is directed to a composite comprising
(a) a nonwoven fabric (NF) being the substrate of the composite, said nonwoven fabric (NF) comprises a polymer (P-1) selected from the group consisting of polyethylene (PE-1), polypropylene (PP-1), polyethylene terephthalate (PET) and polyamide (PA), and
(b) a coating layer (CL) overlaying at least one surface of the nonwoven fabric (NF), said coating layer (CL) comprises a polymer (P-2) being either a polypropylene (PP-2) or a polyethylene (PE-2), wherein the coating layer (CL) and/or the polymer (P-2) has (have)
(i) a LAOS non-linearity factor (LAOS-NLF) measured according to the LAOS method of at least 2.5, and/or
(ii) a $F_{30}$ melt strength of at least 3.0 cN at 200° C. determined by the Rheotens test.

Preferably the coating layer (CL) and/or the polymer (P-2) according to the second aspect has (have)
(a) a branching index g' of equal or below 0.9, and/or
(b) a strain hardening factor (SHF) of at least 2.0 measured at a strain rate of 3.0 $s^{-1}$ and a Hencky strain of 2.5, and/or
(c) a strain hardening factor (SHF) of at least 1.5 measured at a strain rate of 1.0 $s^{-1}$ and a Hencky strain of 2.0.

Surprisingly it has been found out that with such composite even in cases of rather thin coating layers (CL) (low coating weight) good breathability and good barrier properties are achieved (see experimental part).

In the following the present invention (according to the first and second aspect) is described in more detail.

In contrast to known composites in this technical field, the composite of the present invention is not stretched. Thus in a preferred embodiment the composite comprising the nonwoven fabric (NF) and the coating layer (CL) has not been subjected to a stretching step, i.e. is a non-stretched composite. Such stretching steps are commonly used to reduce the thickness of the individual layers, in particular of the barrier layer, i.e. the coating layer (CL), to improve the breathability of the overall composite, in particular of the barrier layer, i.e. coating layer (CL). Accordingly the composite and/or the coating layer (CL) has a draw ratio in machine direction of below 1:3.0 and a draw ratio in transverse direction of below 1:2.5, more preferably a draw ratio in machine direction of below 1:2.0 and a draw ratio in transverse direction of below 1:2.0, yet more preferably a draw ratio in machine direction of below 1:1.8 and a draw ratio in transverse direction of below 1:1.8.

One requirement of the present invention is that at least one surface of the substrate, i.e. the nonwoven fabric (NF), is coated with a branched polymer. Nonwoven fabrics (NF) can be used for many applications, as for instance in hygiene articles like baby diapers and adult incontinence products, protective clothing and construction products like roofing membranes. For such applications at least one surface, i.e. the upper and/or the lower surface, is coated with a polymer constituting the barrier layer. Depending on the specific purposes both surfaces or one of the both are coated with a barrier polymer, i.e. the polymer (P-2) according to this invention. It is in particular preferred that only one surface of the nonwoven fabric (NF) is coated with a barrier polymer, i.e. with a polymer (P-2) according to this invention.

According to another embodiment, the inventive composite comprises two nonwoven fabrics (NF) as defined herein, wherein the coating layer (CL) constitutes the intermediate layer between the two nonwoven fabrics (NF). In this case the two nonwoven fabrics (NF) can be different or identical in chemical (like type of polymer) and physical constitution (like weight, thickness, barrier properties).

Preferably the nonwoven fabric (NF), i.e. the substrate, of the composite has a weight per unit area of at least 15 g/m$^2$, more preferably of at least 20 g/m$^2$, yet more preferably in the range of 25 to 250 g/m$^2$, still more preferably in the range of 30 to 200 g/m$^2$.

Even more preferred the nonwoven fabric (NF), i.e. the substrate, of the composite is a spunponded web, a melt blown web or a combination of both generally called an "SMS"-web. Melt blown webs are being preferred.

In case the nonwoven fabric (NF), i.e. the substrate, of the composite is a spunbonded web it is preferred that the fibers of the web have an (average) diameter of not more than 30.0 μm, like below 25.0 μm, more preferably of not more than 20.0 μm. It is in particular appreciated that the (average) diameter of the fibers is in the range of 8.0 to 25.0 μm, more preferably in the range of 10.0 to 20.0 μm.

In case the nonwoven fabric (NF), i.e. the substrate, of the composite is a melt blown web it is preferred that the fibers of the web have an (average) diameter of not more than 12.0 μm, like below 10.0 μm, more preferably of not more than 8.0 μm. It is in particular appreciated that the (average) diameter of the fibers is in the range of 0.1 to 12.0 μm, like 0.2 to below 10.0 μm, more preferably in the range of 0.5 to 8.0 μm.

The polymer (P-1) used for the preparation of the nonwoven fabric (NF), i.e. the substrate, is selected from the group consisting of polyethylene (PE-1), polypropylene (PP-1), polyethylene terephthalate (PET) and polyamide (PA). It is in particular preferred that the nonwoven fabric (NF), i.e. the substrate, comprises at least 80 wt.-%, more preferably at least 90 wt.-%, yet more preferably at least 95 wt.-%, still more preferably consists of, a polymer (P-1) selected from the group consisting of polyethylene (PE-1), polypropylene (PP-1), polyethylene terephthalate (PET) and polyamide (PA). Accordingly the nonwoven fabric (NF), i.e. the substrate, may comprise in addition to the polymer (P-1) as defined above typical additives, like antioxidants stabilizers, fillers, colorants, nucleating agents and mold release agents. Primary and secondary antioxidants include, for example, hindered phenols, hindered amines, and phosphates. Nucleating agents include, for example, sodium benzoate, sorbitol derivatives like bis-(3,4-dimethylbenzylidene)-sorbitol and nonitol derivatives like 1,2,3-trideoxy-4,6:5,7-bis-O[(4-propylphenyl)methylene]-nonitol.

Other additives such as dispersing agents like glycerol monostearate can also be included. Slip agents include, for example, oleamide and erucamide. Catalyst deactivators are also commonly used, for example, calcium stearate, hydrotalcite, and calcium oxide, and/or other acid neutralizers known in the art. The amount of such additives however shall preferably not exceed 10 wt.-%, more preferably not more than 5 wt.-%, based on the nonwoven fabric (NF), i.e. the substrate. Accordingly in a specific embodiment the nonwoven fabric (NF), i.e. the substrate, may contain additives, in particular those as stated in this paragraph, but no other polymers (P-1) as defined above. It is in particular preferred that the polymer (P-1) used for the preparation of the nonwoven fabric (NF), i.e. the substrate, is polypropylene (PP-1). Accordingly it is appreciated that the nonwoven fabric (NF), i.e. the substrate, comprises as polymer (P-1) component only the polypropylene (PP-1).

The polypropylene (PP-1) can be a random propylene copolymer (R-PP-1) or a propylene homopolymer (H-PP-1), the latter being preferred.

The term random is understood according to IUPAC (Glossary of basic terms in polymer science; IUPAC recommendations 1996). Accordingly it is preferred that the random propylene copolymer (R-PP-1) has a randomness of at least 40%, more preferably of at least 50%, yet more preferably at least 55%, even more preferably of at least 60%, and still more preferably of at least 65%.

In case the polypropylene (PP-1) is a random propylene copolymer (R-PP-1) it comprises monomers copolymerizable with propylene, for example comonomers such as ethylene and/or $C_4$ to $C_{12}$ α-olefins, in particular ethylene and/or $C_4$ to $C_{10}$ α-olefins, e.g. 1-butene and/or 1-hexene. Preferably the random propylene copolymer (R-PP-1) comprises, especially consist of, monomers copolymerizable with propylene from the group consisting of ethylene, 1-butene and 1-hexene. More specifically the random propylene copolymer (R-PP-1) comprises—apart from propylene—units derivable from ethylene and/or 1-butene. In a preferred embodiment the random propylene copolymer (R-PP-1) comprises units derivable from ethylene and propylene only. The comonomer content in the random propylene copolymer (R-PP-1) is preferably relatively low, i.e. up to 6.0 wt.-%, more preferably 0.5 to 5.5 wt.-%, still more preferably 0.5 to 4.0 wt.-%, yet more preferably 0.5 to 3.0 wt.-%.

Accordingly the term "propylene copolymer" according to this invention does not encompass heterophasic systems comprising a polypropylene and dispersed therein an elastomeric component. In fact the polypropylene (PP-1) according to this invention shall preferably not be understood as a mixture of two different polymers being not miscible. The term being "not miscible" indicates polymer mixtures wherein the different polymers due to their different nature form distinguishable phases visible by high resolution microscopy, like electron microscopy or scanning force microscopy. However this does not exclude the option that the polypropylene is a so called bimodal or multimodal polymer. Different to non miscible polymers, bimodal or multimodal polymers comprise fractions which differ in their molecular weight distribution and/or their comonomer content distribution but nevertheless are miscible in the meaning of the invention.

The expression "propylene homopolymer" used in the instant invention relates to a polypropylene that consists substantially, i.e. of at least 99.5 wt.-%, more preferably of at least 99.8 wt.-%, of propylene units. In a preferred embodiment only propylene units in the propylene homopolymer are detectable. The comonomer content can be determined with FT infrared spectroscopy, as described below in the examples.

As stated above it is in particular appreciated that the polypropylene (PP-1) is a propylene homopolymer (H-PP-1).

Preferably the polypropylene (PP-1) is isotactic. Accordingly it is appreciated that the polypropylene (PP-1) has a rather high isotactic triad concentration, i.e. higher than 90%, more preferably higher than 92%, still more preferably higher than 93% and yet more preferably higher than 95%, like higher than 97%.

Further it is appreciated that the xylene soluble content of the polypropylene (PP-1) and/or nonwoven fabric (NF), i.e. the substrate, is/are rather low. Accordingly the polypropylene (PP-1) and/or nonwoven fabric (NF), i.e. the substrate, has/have preferably a xylene cold soluble fraction (XCS) measured according to ISO 6427 (23° C.) of not more than 12.0 wt.-%, more preferably of not more than 10.0 wt.-%, yet more preferably of not more than 9.5 wt.-%, like not more than 9.0 wt.-%. Thus a preferred range is 0.2 to 10.0 wt.-%, more preferred 0.4 to 8.0 wt.-%, still more preferred 0.5 to 6.0 wt.-%.

Preferably the polypropylene (PP-1) has a low amount of mis-insertions within the polymer chain. Accordingly the polypropylene (PP-1) is featured by low amount of <1,2> regiodefects, i.e. of not more than 0.4 mol.-%, more preferably of not more than 0.2 mol.-%, like of not more than 0.1 mol.-%, determined by $^{13}$C-NMR spectroscopy.

Further it is appreciated the polypropylene (PP-1) and/or the nonwoven fabric (NF), i.e. the substrate, according to this invention has/have a melting temperature Tm measured by differential scanning calorimetry (DSC) of least 130° C., preferably at least 135° C., more preferably at least 140° C., like of at least 145° C. Accordingly the melting temperature Tm ranges preferably from 135 to 167° C., more preferably ranges from 140 to 164° C. In particular in case the polypropylene (PP-1) is a propylene homopolymer (H-PP-1), it has a melting temperature Tm measured by differential scanning calorimetry (DSC) of at least 150° C., more preferably of at least 152° C., like of at least 153° C. Accordingly the melting temperature Tm ranges preferably from 150 to 167° C., more preferably ranges from 151 to 164° C. On the other hand in case the polypropylene (PP-1) is a random propylene copolymer (R-PP-1), it has a melting temperature Tm measured by differential scanning calorimetry (DSC) of least 130° C., preferably at least 135° C., more preferably at least 140° C. Accordingly the melting temperature for the random propylene copolymer (R-PP-1) ranges preferably from 130 to 160° C., more preferably ranges from 135 to 155° C.

Further it is appreciated that the polypropylene (PP-1) and/or the nonwoven fabric (NF), i.e. the substrate, has/have a rather high melt flow rate, which is in particular useful in case the nonwoven fabric (NF) is a melt blown web. The melt flow rate mainly depends on the average molecular weight. This is due to the fact that long molecules render the material a lower flow tendency than short molecules. An increase in molecular weight means a decrease in the MFR-value. The melt flow rate (MFR) is measured in g/10 min of the polymer discharged through a defined die under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as $MFR_2$ (230° C.) and the melt flow rate measured under a load of 2.16 kg at 190° C. (ISO 1133) is denoted as $MFR_2$ (190° C.). Accordingly, it is preferred that in the present invention the polypropylene (PP-1) and/or the nonwoven fabric (NF), i.e. the substrate, in case of a melt blown web has/have an $MFR_2$ (230° C.) of at least 200 g/10 min, more preferably of at least 400 g/10 min, still more preferably in the range of in a range of 200 to 3,000 g/10 min, yet more preferably in the range of 400 to 2,000 g/10 min. On the other hand in case the nonwoven fabric (NF), i.e. the substrate, is a spunbonded fabric the polypropylene (PP-1) and/or the nonwoven fabric (NF), i.e. the substrate, has/have an $MFR_2$ (230° C.) ranging preferably from 8 to 80 g/10 min, more preferably from 10 to 60 g/10 min, still more preferably from 15 to 40 g/10 min.

Further the polypropylene (PP-1) and/or the nonwoven fabric (NF), i.e. the substrate, is/are featured by a rather narrow molecular weight distribution (MWD). Accordingly the polypropylene (PP-1) and/or the nonwoven fabric (NF), i.e. the substrate, has/have a molecular weight distribution (MWD) measured according to ISO 16014 of not more than 4.5, more preferably not more than 4.0 yet more preferably not more than 3.5, still more preferably in the range of 1.3 to 4.0, still yet more preferably in the range of 1.5 to 3.5.

The weight average molecular weight (Mw) is the first moment of a plot of the weight of polymer in each molecular weight range against molecular weight. The weight average molecular weight (Mw) is very sensitive to changes in number of large molecules in a given sample of a polymer. Thus it is preferred that the weight average molecular weight (Mw) measured according to ISO 16014 of the polypropylene (PP-1) and/or the nonwoven fabric (NF), i.e. the substrate, in case of a melt blown web is below 85,000 g/mol, more preferably below 90,000 g/mol yet more preferably below 80,000 g/mol. In turn the weight average molecular weight (Mw) of the polypropylene (PP-1) and/or the nonwoven fabric (NF), i.e. the substrate, should be not too low. Thus it is especially preferred that the weight average molecular weight (Mw) measured according to ISO 16014 of the polypropylene (PP-1) and/or the nonwoven fabric (NF), i.e. the substrate, in case of a melt blown web is in the range of 20,000 g/mol to 95,000 g/mol, more preferably in the range of 30,000 to 90,000 g/mol, yet more preferably in the range of 40,000 to 85,000 g/mol. On the other hand the in case the nonwoven fabric (NF), i.e. the substrate, is a spunbonded fabric the polypropylene (PP-1) and/or the nonwoven fabric (NF), i.e. the substrate, has/have a weight average molecular weight (Mw) measured according to ISO 16014 in the range of 120 to 450 kg/mol, more preferably from 150 to 380 kg/mol, still more preferably from 200 to 350 kg/mol.

A polypropylene (PP-1) with such melt flow rates and molecular weight distributions as discussed above can be obtained by visbreaking or by direct polymerization for instance by using a metallocene catalyst. In the present case the polypropylene (PP-1) has been preferably obtained by visbreaking. Thus it is preferred that the polypropylene (PP-1) before visbreaking has an $MFR_2$ (230° C.) of not more than 150 g/10 min, more preferably in the range of 15 to 120 g/10 min, yet more preferably in the range of 20 to 100 g/10 min. Preferably the initially used polypropylene (PP-1') is chosen in such a manner that the visbreaking ratio [final $MFR_2$ (230° C.)/initial $MFR_2$ (230° C.)] is 2.0 to 70.0, more preferably 5.0 to 50.0, wherein "initial $MFR_2$ (230° C.)" is the $MFR_2$ (230° C.) of the polypropylene (PP-1') before visbreaking and "final $MFR_2$ (230° C.)" is the $MFR_2$ (230° C.) of the polypropylene (PP-1) after visbreaking.

The polymers (P-1) are known in the art and thus readily obtainable for a person skilled in the art. For instance the polypropylene (PP-1) can be obtained by polymerizing propylene optionally together with comonomers as defined above in the presence of a metallocene catalyst or Ziegler-Natta catalyst. Preferably the polypropylene (PP-1) is prepared by polymerizing, in a slurry reactor, for example a loop reactor, propylene optionally together with at least another comonomer as defined above, in the presence of a polymerization catalyst to produce a part of the polypropylene (PP-1). This part is then transferred to a subsequent gas phase reactor, whereupon in the gas phase reactor propylene is reacted optionally in the presence of comonomers as defined above in order to produce a further part in the presence of the reaction product of the first step. This reaction sequence provides a reactor blend of parts (i) and (ii) constituting the polypropylene (PP-1). It is of course possible by the present invention that the first reaction is carried out in a gas phase reactor while the second polymerization reaction is carried out in a slurry reactor, for example a loop reactor. It is furthermore also possible to reverse the order of producing parts (i) and (ii), which has been described above in the order of first producing part (i) and then producing part (ii). The above-discussed process, comprising at least two polymerization steps, is advantageous in view of the fact that it provides easily controllable reaction steps enabling the preparation of a desired reactor blend. The polymerization steps may be adjusted, for example by appropriately selecting monomer feed, comonomer feed, hydrogen feed, temperature and pressure in order to suitably adjust the properties of the polymerization products obtained. It is in particular possible to obtain a multimodality, preferably the bimodality, of the polypropylene (PP-1), with respect to the comonomer, like ethylene, distribution as well as with respect to the molecular weights and $MFR_2$ (230° C.) values during said multistage polymerization procedures.

Such a process can be carried out using any suitable catalyst for the preparation of the polypropylene (PP-1). Preferably, the process as discussed above is carried out using a Ziegler-Natta catalyst, in particular a high yield Ziegler-Natta catalyst (so-called fourth and fifth generation type to differentiate from low yield, so called second generation Ziegler-Natta catalysts). A suitable Ziegler-Natta catalyst to be employed in accordance with the present invention comprises a catalyst component, a co-catalyst component and at least one electron donor (internal and/or external electron donor, preferably at least one external donor). Preferably, the catalyst component is a Ti—Mg-based catalyst component and typically the co-catalyst is an Al-alkyl based compound. Suitable catalysts are in particular disclosed in U.S. Pat. No. 5,234,879, WO 92/19653, WO 92/19658 and WO 99/33843.

Preferred external donors are the known silane-based donors, such as dicyclopentyl dimethoxy silane, diethylaminotriethoxysilane or cyclohexyl methyldimethoxy silane.

One embodiment of a process as discussed above is a loop-gas phase process, such as developed by Borealis, known as Borstar® technology, described for example in EP 0 887 379 A1 and WO 92/12182.

With respect to the above-mentioned preferred slurry-gas phase process, the following general information can be provided with respect to the process conditions.

Temperature of from 40 to 110° C., preferably between 60 and 100° C., in particular between 80 and 90° C., with a pressure in the range of from 20 to 80 bar, preferably 30 to 60 bar, with the option of adding hydrogen in order to control the molecular weight. The reaction product of the slurry polymerization, which preferably is carried out in a loop reactor, is then transferred to the subsequent gas phase reactor, wherein the temperature preferably is within the range of from 50 to 130° C., more preferably 80 to 100° C., at a pressure in the range of from 5 to 50 bar, preferably 15 to 35 bar, again with the option of adding hydrogen in order to control the molecular weight.

The residence time can vary in the reactor zones identified above. In embodiments, the residence time in the slurry reaction, for example the loop reactor, is in the range of from 0.5 to 5 hours, for example 0.5 to 2 hours, while the residence time in the gas phase reactor generally will be from 1 to 8 hours.

The properties of the polypropylene (PP-1) produced with the above-outlined process may be adjusted and controlled with the process conditions as known to the skilled person, for example by one or more of the following process parameters: temperature, hydrogen feed, comonomer feed, propylene feed, catalyst, type and amount of external donor, split between two or more components of a multimodal polymer.

In case the polypropylene (PP-1) is subjected a visbreaking step, the visbreaking may be carried out in any known manner, like by using a peroxide visbreaking agent. Typical visbreaking agents are 2,5-dimethyl-2,5-bis(tert.butyl-peroxy)hexane (DHBP) (for instance sold under the tradenames Luperox 101 and Trigonox 101), 2,5-dimethyl-2,5-bis(tert.butyl-peroxy)hexyne-3 (DYBP) (for instance sold under the tradenames Luperox 130 and Trigonox 145), dicumyl-peroxide (DCUP) (for instance sold under the tradenames Luperox DC and Perkadox BC), di-tert.butyl-peroxide (DTBP) (for instance sold under the tradenames Trigonox B and Luperox Di), tert.butyl-cumyl-peroxide (BCUP) (for instance sold under the tradenames Trigonox T and Luperox 801) and bis(tert.butylperoxy-isopropyl)benzene (DIPP) (for instance sold under the tradenames Perkadox 14S and Luperox DC). Suitable amounts of peroxide to be employed in accordance with the present invention are in principle known to the skilled person and can easily be calculated on the basis of the amount of polypropylene to be subjected to visbreaking, the $MFR_2$ (230° C.) value of the polypropylene to be subjected to visbreaking and the desired target $MFR_2$ (230° C.) of the product to be obtained. Accordingly, typical amounts of peroxide visbreaking agent are from 0.005 to 0.5 wt.-%, more preferably from 0.01 to 0.2 wt.-%, based on the amount of polypropylene employed.

Typically, visbreaking in accordance with the present invention is carried out in an extruder, so that under the suitable conditions, an increase of melt flow rate is obtained. During visbreaking, higher molar mass chains of the starting product are broken statistically more frequently than lower molar mass molecules, resulting as indicated above in an overall decrease of the average molecular weight and an increase in melt flow rate.

The thus obtained polypropylene (PP-1) is used in pellet or granule form for the preparation of the nonwoven fabric (NF). In case the nonwoven fabric (NF) is a melt blown web the following process is used. In the melt blown web process preferably metering pumps are used to pump the molten polypropylene (PP-1) to a distribution system having a series of die tips, the polypropylene (PP-1) being in the molten state at some processing temperature. The die tip is designed in such a way that the holes are in a straight line with high-velocity air impinging from each side. A typical die will have 0.3 to 0.5 mm diameter, preferably 0.4 mm diameter, holes spaced at 10 to 16 per cm (25 to 40 per inch). The impinging high-velocity hot air attenuates the filaments and forms the desired fibers. Immediately below or adjacent to the die, a large amount of ambient air is drawn into the hot air stream containing the fibers which cools the hot gas and solidifies the fibers onto a forming belt or other solid surface that is typically moving in such a manner as to create a continually renewed surface for the fibers to contact and form a web. The processing temperature is one factor in the final web properties. The "optimal" processing temperature is one at which ideal properties of the web are achieved such as low shot with good hand and high barrier properties, or good filtration properties.

The properties of the nonwoven fabric (NF), i.e. the melt blown web, can be significantly improved in case the cooling of the fibers is not accomplished with ambient air but by water cooling.

A further essential component of the inventive composite is the coating layer (CL). As stated above, the coating layer overlays the nonwoven fabric (NF) or in an alternative embodiment the coating layer is the intermediate layer between two nowoven fabric (NF). Accordingly the coating layer (CL) is preferably an extrusion coating layer. An essential finding of the present invention is that with the specific selection of polymer (P-2), namely being a branched polymer (P-2), the coating weight if the coating layer (CL) can be rather low without compromising the good barrier properties of the composite and improving the breathability of the coating layer (CL). Accordingly it is preferred that the coating layer (CL) has a weight per unit area of equal or below 20 g/m$^2$, more preferably below 16 g/m$^2$, still more preferably in the range of 2 to equal or below 20 g/m$^2$, yet more preferably in the range of 3 to equal or below 16 g/m$^2$.

Preferably the coating layer (CL) comprises at least 80 wt.-%, more preferably at least 90 wt.-%, yet more preferably at least 95 wt.-%, still more preferably consists of, the polymer (P-2). Accordingly the coating layer (CL) may comprise in addition to the polymer (P-2) as defined above typical additives, like antioxidants stabilizers, nucleating agents and mold release agents. The amount of such additives however shall preferably not exceed 10 wt.-%, more preferably not more than 5 wt.-%, based on the coating layer (CL). Accordingly in a specific embodiment the coating layer (CL) may contain additives but no other polymers beside the polymer (P-2) as defined in the instant invention. It is in particular preferred that the polymer (P-2) used for the preparation of the coating layer (CL) is a polypropylene (PP-2) or a polyethylene (PE-2) as defined in detail below. Accordingly it is appreciated that the coating layer (CL) comprises as polymer (P-2) component only a polypropylene (PP-2) or a polyethylene (PE-2). Even though the coating layer (CL) and the polymer (P-2) may comprise additives, the coating layer (CL) and the polymer (P-2) are preferably free of fillers. Fillers according to this invention are preferably particles being chemically inert and/or have a medium particle size of at least 0.05 µm, more preferably of at least 0.1 µm, like of at least 1.0 µm. Typical examples which shall be not present in the coating layer (CL) and the polymer (P-2) are silica, particularly in the form of glass or quartz; silicates, particularly talcum; titanates, titanium dioxide, aluminum oxide, kaolin, magnesium oxide, magnesite, iron oxides, silicon carbide, silicon nitride, barium sulfate and/or calcium carbonates.

Accordingly the coating layer (CL) can be further defined by the ash content, which is preferably rather low as preferably only low amounts of additives have been used. Thus it is appreciated that the coating layer (CL) has an ash content of equal or below 1.5 wt.-%, more preferably equal or below 1.0 wt.-%, yet more preferably below 0.8 wt.-%.

A further characterizing feature of the inventive coating layer (CL) is that it is free of pores even at a weight per unit area of equal or below 20 g/m$^2$, more preferably equal or below 16 g/m$^2$ analyzed with scanning electron microscopy (see figures).

For being processable at high speeds the flowability of the polymer (P-2) must be high. Accordingly, if the polymer (P-2) is a polypropylene (PP-2) it shall preferably have a melt flow rate MFR$_2$ (230° C.) measured according to ISO 1133 of more than 15.0 g/10 min, preferably of more than 20.0 g/10 min, yet more preferably in the range of 20.0 to 100.0 g/10 min. Again, if the polymer (P-2) is a polyethylene (PE-2) it shall have a melt flow rate MFR$_2$ (190° C.) measured according to ISO 1133 of more than 8.0 g/10 min, preferably of more than 12.0 g/10 min, yet more preferably in the range of 12.0 to 80.0 g/10 min.

Such low weights of the coating layer (CL) are only achievable with the specific selection of polymer (P-2). Accordingly the polymer (P-2) must be of branched structure. It is known that branched polymers show enhanced melt strength. Accordingly branched polymers can be determined by their rheological behavior. Accordingly the polymer (P-2) being either a polypropylene (PP-2) or a polyethylene (PE-2) has preferably a strain hardening factor (SHF) measured at a strain rate of 3.0 s$^{-1}$ and a Hencky strain of 2.5 of at least 2.0, more preferably of at least 2.2, yet more preferably in the range of 2.0 to 7.0, still more preferably in the range of 2.2 to 6.5. The exact measuring method is defined in the example section. Alternatively or additionally the polymer (P-2), i.e. the polypropylene (PP-2) or the polyethylene (PE-2), preferably has a strain hardening factor (SHF) of 1.5 to 6.0, more preferably of 1.7 to 5.5, when measured at a strain rate of 1.0 s$^{-1}$ and a Hencky strain of 2.0.

Additionally or alternatively the polymer (P-2) being either a polypropylene (PP-2) or a polyethylene (PE-2) has a F$_{30}$ melt strength of at least 3.0 cN, more preferably in the range of 3.5 to 50 cN, yet more preferably in the range of 4.0 to 40 cN, at 200° C. determined in the Rheotens test as described in the experimental part.

It is also preferred that the polymer (P-2) being either a polypropylene (PP-2) or a polyethylene (PE-2) has a LAOS non-linearity factor (LAOS-NLF) of at least 2.5, more preferably in the range of 2.5 to 10.0, yet more preferably in the range of 3.0 to 8.0, measured according to the LAOS method as described in the experimental part.

An alternative approach to determine the branching character of the polymer (P-2) is the branching index g'. The branching index g' correlates with the amount of branches of a polymer. The branching index g' is defined as g'=[IV]$_{br}$/[IV]$_{lin}$ in which g' is the branching index, [IV]$_{br}$ is the intrinsic viscosity of the branched polymer and [IV]$_{lin}$ is the intrinsic viscosity of the linear polymer having the same weight average molecular weight (within a range of ±10%) as the branched polymer. Thereby, a low g'-value is an indicator for a high branched polymer. In other words, if the g'-value decreases, the branching of the polymer increases. Reference is made in this context to B. H. Zimm and W. H. Stockmeyer, J. Chem. Phys. 17,1301 (1949). This document is herewith incorporated by reference. Thus it is preferred that the branching index g' of the polymer (P-2) shall be less than 0.9, more preferably equal or less than 0.8, like less than 0.7.

Of course not only the polymer (P-2) has such a strain hardening behavior and flowability but also the coating layer (CL). Thus the preferred values of MFR$_2$, SHI, F$_{30}$, LAOS-NLF, and g' as defined above for the polymer (P-2) are equally applicable for the coating layer (CL).

As already apparent from the naming of the polymer (P-1) and the polymer (P-2) they must be chemically different. One preferred difference is that the polymer (P-2) is branched as defined above whereas the polymer (P-1) is not branched. Accordingly in one preferred embodiment polymer (P-1) has for instance a branching index g' more than 0.9, like 1.0.

A further distinguishing feature between the polymer (P-1) and the polymer (P-2) is the melt flow rate. Accordingly the melt flow rate of the polymer (P-2) is lower compared to the melt flow rate of the polymer (P-1).

As will be explained in detail below the polymer (P-2) can be inter alia obtained by modifying, i.e. chemically modifying, the polymer. Such a modification enable a person skilled in the art to achieve the branching structure and/or the strain hardening phenomena of the polymer (P-2). However different to crosslinked polymers which are featured by a high gel content the polymer (P-2) of the present invention is characterized by a moderate gel content, i.e. of below 1.0 wt.-%, even more preferred of not more than 0.80 wt.-%, still more preferred of not more than 0.50 wt.-% determined as the relative amount of polymer insoluble in boiling xylene (xylene hot insoluble fraction, XHI). On the other hand the polymer (P-2) must have a certain degree of branching and thus a certain amount of gel content, i.e. of at least 0.15 wt.-%, more preferably of at least 0.27 wt.-%. Thus a preferred range for the gel content of the polymer (P-2) is 0.05 to 0.90 wt.-%, more preferred 0.20 to 0.8 wt.-%.

As stated above the polymer (P-2) can be either a polypropylene (PP-2) or a polyethylene (PE-2). In the following both polymer types are discussed separately.

The polymer (P-2) being a polypropylene (PP-2) has preferably a melt flow rate $MFR_2$ (230° C.) measured according to ISO 1133 in a range of 8.0 to 60.0 g/10 min, more preferably in a range of 10.0 to 40.0 g/10 min, still more preferably in a range of 15.0 to 30.0 g/10 min. As stated above, in case the polypropylene (PP-2) shall be processable at high speeds the flowability must be high. Accordingly it is in particular appreciated that the polypropylene (PP-2) has a melt flow rate $MFR_2$ (230° C.) measured according to ISO 1133 of more than 15.0 g/10 min, preferably of more than 20.0 g/10 min, yet more preferably in the range of 20.0 to 100.0 g/10 min, still more preferably in the range of 20.0 to 60.0 g/10 min, like in the range of 15.0 to 40.0 g/10 min or in the range of 15.0 to 30.0 g/10 min.

Preferably, the polypropylene (PP-2) has a density measured according ISO 1183-187 of at least 870 $kg/m^3$, more preferably of at least 890 $kg/m^3$ and most preferably of at least 900 $kg/m^3$.

Further, preferably, the polypropylene (PP-2) has a density measured according ISO 1183-187 of not more than 925 $kg/m^3$, more preferably of not more than 915 $kg/m^3$ and most preferably of not more than 910 $kg/m^3$.

Preferably, the polypropylene (PP-2) has a melting point of at least 130° C., more preferably of at least 135° C. and most preferably of at least 140° C.

Preferably the polypropylene (PP-2) is a modified polypropylene. Accordingly the polypropylene (PP-2) can be further defined by the way obtained. The polypropylene (PP-2) is preferably the result of treating an unmodified polypropylene (PP-2') with thermally decomposing radical-forming agents and/or with ionizing radiation. However in such a case a high risk exists that the polypropylene (PP-2') is degraded, which is detrimental. Thus it is preferred that the modification is accomplished by the use of bifunctionally unsaturated monomer(s) and/or multifunctionally unsaturated low molecular weight polymer(s) as chemically bound bridging unit(s). A suitable method to obtain the polypropylene (PP-2) is for instance disclosed in U.S. Pat. No. 6,388,020, U.S. Pat. Nos. 6,433,109, and 6,077,907. All documents are herewith incorporated by reference. Thereby, the amount of peroxide is preferably in the range of 0.05 to 3.00 wt.-% based on the unmodified polypropylene (PP-2').

Accordingly in one preferred embodiment the polypropylene (PP-2) comprises units derived from
(i) propylene and
(ii) bifunctionally unsaturated monomer(s) and/or multifunctionally unsaturated low molecular weight polymer(s).

"Bifunctionally unsaturated or multifunctionally unsaturated" as used above means preferably the presence of two or more non-aromatic double bonds, as in e.g. divinylbenzene or cyclopentadiene or polybutadiene. Only such bi- or multifunctionally unsaturated compounds are used which can be polymerized preferably with the aid of free radicals. The unsaturated sites in the bi- or multifunctionally unsaturated compounds are in their chemically bound state not actually "unsaturated", because the double bonds are each used for a covalent bond to the polymer chains of the polypropylene (PP-2').

Reaction of the bifunctionally unsaturated monomer(s) and/or multifunctionally unsaturated low molecular weight polymer(s), preferably having a number average molecular weight ($M_n$)≤10000 g/mol, synthesized from one and/or more unsaturated monomers with the polypropylene (PP-2') may be performed in the presence of a thermally free radical forming agent, e. g. decomposing free radical-forming agent, like a thermally decomposable peroxide and/or ionizing radiation or microwave radiation.

The bifunctionally unsaturated monomers may be
divinyl compounds, such as divinylaniline, m-divinylbenzene, p-divinylbenzene, divinylpentane and divinylpropane;
allyl compounds, such as allyl acrylate, allyl methacrylate, allyl methyl maleate and allyl vinyl ether;
dienes, such as 1,3-butadiene, chloroprene, cyclohexadiene, cyclopentadiene, 2,3-dimethylbutadiene, heptadiene, hexadiene, isoprene and 1,4-pentadiene;
aromatic and/or aliphatic bis(maleimide) bis(citraconimide) and mixtures of these unsaturated monomers.

Especially preferred bifunctionally unsaturated monomers are 1,3-butadiene, isoprene, dimethyl butadiene and divinylbenzene.

The multifunctionally unsaturated low molecular weight polymer, preferably having a number average molecular weight ($M_n$)≤10000 g/mol may be synthesized from one or more unsaturated monomers.

Examples of such low molecular weight polymers are
polybutadienes, especially where the different microstructures in the polymer chain, i.e. 1,4-cis, 1,4-trans and 1,2-(vinyl) are predominantly in the 1,2-(vinyl) configuration
copolymers of butadiene and styrene having 1,2-(vinyl) in the polymer chain.

A preferred low molecular weight polymer is polybutadiene, in particular a polybutadiene having more than 50.0 wt.-% of the butadiene in the 1,2-(vinyl) configuration.

The polypropylene (PP-2) may contain more than one bifunctionally unsaturated monomer and/or multifunctionally unsaturated low molecular weight polymer. Even more preferred the amount of bifunctionally unsaturated monomer(s) and multifunctionally unsaturated low molecular weight polymer(s) together in the polypropylene (PP-2) is 0.01 to 10.0 wt.-% based on said polypropylene (PP-2).

As stated above it is preferred that the bifunctionally unsaturated monomer(s) and/or multifunctionally unsaturated low molecular weight polymer(s) are used in the presence of a thermally decomposing free radical-forming agent.

Peroxides are preferred thermally decomposing free radical-forming agents. More preferably the thermally decomposing free radical-forming agents are selected from the group consisting of acyl peroxide, alkyl peroxide, hydroperoxide, perester and peroxycarbonate.

The following listed peroxides are in particular preferred:

Acyl peroxides: benzoyl peroxide, 4-chlorobenzoyl peroxide, 3-methoxybenzoyl peroxide and/or methyl benzoyl peroxide.

Alkyl peroxides: allyl t-butyl peroxide, 2,2-bis(t-butylperoxybutane), 1,1-bis(t-butylperoxy)-3,3,5-trimethylcyclohexane, n-butyl-4,4-bis(t-butylperoxy)valerate, diisopropylaminomethyl-t-amyl peroxide, dimethylaminomethyl-t-amyl peroxide, diethylaminomethyl-t-butyl peroxide, dimethylaminomethyl-t-butyl peroxide, 1,1-di-(t-amylperoxy)cyclohexane, t-amyl peroxide, t-butylcumyl peroxide, t-butyl peroxide and/or 1-hydroxybutyl n-butyl peroxide.

Peresters and peroxy carbonates: butyl peracetate, cumyl peracetate, cumyl perpropionate, cyclohexyl peracetate, di-t-butyl peradipate, di-t-butyl perazelate, di-t-butyl perglutarate, di-t-butyl perthalate, di-t-butyl persebacate, 4-nitrocumyl perpropionate, 1-phenylethyl perbenzoate, phenylethyl nitro-perbenzoate, t-butylbicyclo-(2,2,1)heptane percarboxylate, t-butyl-4-carbomethoxy perbutyrate, t-butylcyclobutane percarboxylate, t-butylcyclohexyl peroxycarboxylate, t-butylcyclopentyl percarboxylate, t-butylcyclopropane percarboxylate, t-butyldimethyl percinnamate, t-butyl-2-(2,2-diphenylvinyl) perbenzoate, t-butyl-4-methoxy perbenzoate, t-butylperbenzoate, t-butylcarboxycyclohexane, t-butyl pernaphthoate, t-butyl peroxyisopropylcarbonate, t-butyl pertoluate, t-butyl-1-phenylcyclopropyl percarboxylate, t-butyl-2-propylperpentene-2-oate, t-butyl-1-methylcyclopropyl percarboxylate, t-butyl-4-nitrophenyl peracetate, t-butylnitrophenyl peroxycarbamate, t-butyl-N-succiimido percarboxylate, t-butyl percrotonate, t-butyl permaleic acid, t-butyl permethacrylate, t-butyl peroctoate, t-butyl peroxyisopropylcarbonate, t-butyl perisobutyrate, t-butyl peracrylate and/or t-butyl perpropionate.

Or mixtures of these above listed free radical-forming agents.

The unmodified polypropylene (PP-2') to prepare such a polypropylene (PP-2) has preferably a melt flow rate MFR$_2$ (230° C.) measured according to ISO 1133 in a range of 0.05 to 45.0 g/10 min.

Preferably the unmodified polypropylene (PP-2') is a propylene homopolymer (H-PP-2').

In case the polymer (P-2) is a polyethylene (PE-2) the following properties are of interest in addition to the melt strength behavior as defined above.

Typically the polyethylene (PE-2) is selected from the group consisting of an ethylene homopolymer (H-PE-2), an ethylene-vinyl acetate copolymer (EVA), an ethylene-butyl acrylate copolymer (EBA), an ethylene-methyl acrylate copolymer (EMA), and mixtures thereof.

Accordingly in preferred embodiments the polyethylene (PE-2) is an ethylene homopolymer (H-PE-2), like a low density polyethylene (LDPE), or a mixture of an an ethylene homopolymer (H-PE-2), like a low density polyethylene (LDPE), with at least one compound selected from the group consisting of an ethylene-vinyl acetate copolymer (EVA), an ethylene-butyl acrylate copolymer (EBA), and an ethylene-methyl acrylate copolymer (EMA). It is in particular preferred that the polyethylene (PE-2) is an ethylene homopolymer (H-PE-2), like a low density polyethylene (LDPE).

The expression "ethylene homopolymer" used in the instant invention relates to a polyethylene that consists substantially, i.e. of at least 99.5 wt.-%, more preferably of at least 99.8 wt.-%, of ethylene units. In a preferred embodiment only ethylene units in the ethylene homopolymer are detectable. The comonomer content can be determined with FT infrared spectroscopy, as described below in the examples.

Additionally it is preferred that the polyethylene (PE-2), preferably the ethylene homopolymer (H-PE-2), like the low density polyethylene (LDPE), has a melt flow rate MFR$_2$ (190 C) in the range of 3.0 to 60.0 g/10 min, more preferably in the range of 5.0 to 50.0 g/10 min, and yet more preferably in the range of 6.0 to 30.0 g/10 min. As stated above, incase the polyethylene (PE-2) shall be processable at high speeds the flowability must be high. Accordingly it is in particular appreciated that the polyethylene (PE-2), preferably the ethylene homopolymer (H-PE-2), like the low density polyethylene (LDPE), has a melt flow rate MFR$_2$ (190° C.) measured according to ISO 1133 of more than 8.0 g/10 min, preferably of more than 12.0 g/10 min, yet more preferably in the range of 12.0 to 80.0 g/10 min, still more preferably in the range of 12.0 to 60.0 g/10 min, like in the range of 12.0 to 50.0 g/10 min or in the range of 12.0 to 30.0 g/10 min.

Further it is appreciated that the polyethylene (PE-2), preferably the ethylene homopolymer (H-PE-2), like the low density polyethylene (LDPE), has a density measured according ISO 1183-187 in the range of 905 to 940 kg/m$^3$, more preferably in the range of 910 to 930 kg/m$^3$.

The polyethylene (PE-2), preferably the ethylene homopolymer (H-PE-2), like the low density polyethylene (LDPE), is obtained known in the art. Accordingly the polyethylene (PE-2), preferably the ethylene homopolymer (H-PE-2), like the low density polyethylene (LDPE), is in particular obtainable by high-pressure radical polymerization in a tubular or autoclave process at a pressure of 1200 to 3000 bar and a temperature of 150 to 300° C. Suitable processes and products are for example described in the "Encyclopedia of Polymer Science and Technology", Vol. 2, pages 412-441 (Wiley Interscience, 2002).

A further advantage of the present invention is that between the coating layer (CL) and the nonwoven fabric (NF) no adhesive (A) is present.

Further it is preferred that the nonwoven fabric (NF) and the coating layer (CL) are based on the same polymer type as this improves the adhesion between the two layers.

The extrusion coating process may be carried out using conventional extrusion coating techniques. Hence, the polymer (P-2) is fed, optionally together with additives, to an extruding device. From the extruder the polymer (P-2) melt is passed through a flat die to the substrate being the nonwoven fabric (NF) to be coated. Due to the distance between the die lip and the nip, the molten plastic is oxidized in the air for a short period, usually leading to an improved adhesion between the coating layer (CL) and the substrate. The coated substrate is cooled on a chill roll, after which it is passed to edge trimmers and wound up. The width of the line may vary between, for example 500 to 1500 mm, e.g. 800 to 1100 mm, with a line speed of up to 5000 m/min, preferably up to 1500 m/min and more preferably up to 1000 m/min, for instance 500 to 800 m/min. The temperature of the polymer (P-2) melt is typically between 270 and 300° C.

It is also possible to employ a coating line with at least two extruders to make it possible to produce multilayered coatings with different polymers. It is also possible to have arrangements to treat the polymer (P-2) melt exiting the die to improve adhesion, e.g. by ozone treatment, corona treatment or flame treatment.

The coating will typically have an average thickness of 2.0 to 25.0 μm, preferably of 3.0 to 18.0 μm.

Finally the present invention is also directed to the use of a polymer (P-2) as defined above as a coating layer (CL) on the nonwoven fabric (NF). The polymer (P-2) is in particular used to impart a water vapor transmission rate (WVTR) for a coated nonwoven fabric, i.e. the composite according to the invention, measured according to DIN 53122/1 of at least 4.5 g/m$^2$/24 h, more preferably of at least more than 6.0 g/m$^2$/24 h, yet more preferably of at least 9.0 g/m$^2$/24 h. Such a water vapor transmission rate (WVTR) is especially obtained by using a polymer (P-2) as defined herein wherein the coating layer (CL) has a weight per unit area of equal or below 20 g/m$^2$, more preferably equal or below 16 g/m$^2$, still more preferably in the range of 2 to equal or below 20 g/m$^2$, yet more preferably in the range of 3 to equal or below 16 g/m$^2$.

The present invention will now be described in further detail by the examples provided below.

EXAMPLES

1. Definitions/Measuring Methods

The following definitions of terms and determination methods apply for the above general description of the invention as well as to the below examples unless otherwise defined.

NMR-Spectroscopy Measurements:

The $^{13}$C-NMR spectra of polypropylenes were recorded on Bruker 400 MHz spectrometer at 130° C. from samples dissolved in 1,2,4-trichlorobenzene/benzene-d6 (90/10 w/w). For the triad analysis the assignment is done according to the methods described in literature: (T. Hayashi, Y. Inoue, R. Chüjö, and T. Asakura, Polymer 29 138-43 (1988), and Chujo R, et al, Polymer 35 339 (1994).

The NMR-measurement was used for determining the mm triad concentration in a manner well known in the art.

Melting temperature Tm, crystallization temperature Tc: measured with Mettler TA820 differential scanning calorimetry (DSC) on 5 to 10 mg samples. DSC is run according to ISO 3146/part 3/method C2 in a heat/cool/heat cycle with a scan rate of 10° C./min in the temperature range of +23 to +210° C. Crystallization temperature and enthalpy are determined from the cooling step, while melting temperature and melting enthalpy are determined from the second heating step 2,1-propylene Insertions The relative amount of 2,1-insertions of propylene monomers in the chain was determined by $^{13}$C-NMR spectroscopy and calculated as described in EP 0 629 632 B1.

Randomness

In the FTIR measurements, films of 250-mm thickness were compression moulded at 225° C. and investigated on a Perkin-Elmer System 2000 FTIR instrument. The ethylene peak area (760-700 cm$^{-1}$) was used as a measure of total ethylene content. The absorption band for the structure —P-E-P— (one ethylene unit between propylene units), occurs at 733 cm$^{-1}$. This band characterizes the random ethylene content. For longer ethylene sequences (more than two units), an absorption band occurs at 720 cm$^{-1}$. Generally, a shoulder corresponding to longer ethylene runs is observed for the random copolymers. The calibration for total ethylene content based on the area and random ethylene (PEP) content based on peak height at 733 cm$^{-1}$ was made by $^{13}$C-NMR. (Thermochimica Acta, 66 (1990) 53-68).

Randomness=random ethylene (—P-E-P—) content/ the total ethylene content×100%.

Molecular Weight Averages, Molecular Weight Distribution, Branching Index (Mn, Mw, MWD, g') Determined by SEC/VISC-LS Molecular weight averages (Mw, Mn), molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4 2003. A PL 220 (Polymer Laboratories) GPC equipped with a refractive index (RI), an online four capillary bridge viscometer (PL-BV 400-HT), and a dual light scattering detector (PL-LS 15/90 light scattering detector) with a 15° and 90° angle was used. 3× Olexis and 1× Olexis Guard columns from Polymer Laboratories as stationary phase and 1,2,4-trichlorobenzene (TCB, stabilized with 250 mg/L 2,6-Di tert butyl-4-methyl-phenol) as mobile phase at 160° C. and at a constant flow rate of 1 mL/min was applied. 200 μL of sample solution were injected per analysis. The corresponding detector constants as well as the inter detector delay volumes were determined with a narrow PS standard (MWD=1.01) with a molar mass of 132900 g/mol and a viscosity of 0.4789 dl/g. The corresponding dn/dc for the used PS standard in TCB is 0.053 cm$^3$/g.

The molar mass at each elution slice was determined by light scattering using a combination of two angels 15° and 90°. All data processing and calculation was performed using the Cirrus Multi-Offline SEC-Software Version 3.2 (Polymer Laboratories a Varian inc. Company). The molecular weight was calculated using the option in the Cirrus software "use combination of LS angles" in the field "sample calculation options subfield slice MW data from".

The data processing is described in details in G. Saunders, P. A. G: Cormack, S. Graham; D. C. Sherrington, Macromolecules, 2005, 38, 6418-6422. Therein the $Mw_i$ at each slice is determined by the 90° angle by the following equation:

$$Mw_i = \frac{K_{LS} * R(\theta)^{90°}}{\frac{dn}{dc} * R * P(\theta)}$$

The Rayleigh ratio $R(\theta)^{90°}$ of the 90° angle is measured by the LS detector and R is the response of the RI-detector. The particle scatter function $P(\theta)$ is determined by the usage of both angles (15° and 90°) as described by C. Jackson and H. G. Barth (C. Jackson and H. G. Barth, "Molecular Weight Sensitive Detectors" in Handbook of Size Exclusion Chromatography and related techniques, C.-S. Wu, $2^{nd}$ ed., Marcel Dekker, New York, 2004, p. 103). For the low and high molecular region in which less signal of the LS detector or RI detector respectively was achieved a linear fit was used to correlate the elution volume to the corresponding molecular weight.

The dn/dc used in the equation is calculated from the detector constant of the RI detector, the concentration c of the sample and the area of the detector response of the analysed sample. The relative amount of branching is determined using the g'-index of the branched polymer sample. The long chain branching (LCB) index is defined as g'=[η]$_{br}$/[η]$_{lin}$. It is well known if the g' value increases the branching content decreases. [η] is the intrinsic viscosity at 160° C. in trichloorbenzene of the polymer sample at a certain molecular weight and is measured by an online viscosity and a concentration detector. The intrinsic viscosities were measured as described in the handbook of the Cirrus Multi-Offline SEC-Software Version 3.2 with use of the Solomon-Gatesman equation.

The necessary concentration of each elution slice is determined by a RI detector. $[\eta]_{lin}$ is the intrinsic viscosity of a linear sample and $[\eta]_{br}$ the viscosity of a branched sample of the same molecular weight and chemical composition. The number average of $g'_n$ and the weight average $g'_w$ are defined as:

$$g'_n = \frac{\sum_0^i a_i * \frac{[\eta]_{br,i}}{[\eta]_{lin,i}}}{\sum a_i}$$

$$g'_w = \frac{\sum_0^i A_i * \frac{[\eta]_{br,i}}{[\eta]_{lin,i}}}{\sum_0^i A_i * \left(\frac{[\eta]_{br,i}}{[\eta]_{lin,i}}\right)^2}$$

where $a_i$ is dW/d log M of fraction i and $A_i$ is the cumulative dW/d log M of the polymer up to fraction i. The $[\eta]_{lin}$ of the linear reference (linear isotactic PP) over the molecular weight was measured with an online viscosity detector. Following K and α values were obtained (K=30.68*10$^{-3}$ and α=0.681) from the linear reference in the molecular weight range of log M=4.5-6.1. The $[\eta]_{lin}$ per slice molecular weight for the g' calculations was calculated by following relationship $[\eta]_{lin,i} = K*M_i^\alpha$. $[\eta]_{br,i}$ was measured for each particular sample by online viscosity and concentration detector.

MFR$_2$ (230° C.) is measured according to ISO 1133 (230° C., 2.16 kg load)

MFR$_2$ (190° C.) is measured according to ISO 1133 (190° C., 2.16 kg load)

Density is measured according to ISO 1183-187. Sample preparation is done by compression moulding in accordance with ISO 1872-2:2007

Comonomer content in polyethylene was measured in a known manner based on Fourier transform infrared spectroscopy (FTIR) calibrated with $^{13}$C-NMR, using Nicolet Magna 550 IR spectrometer together with Nicolet Omnic FTIR software.

Films having a thickness of about 250 µm were compression molded from the samples. Similar films were made from calibration samples having a known content of the comonomer. The comonomer content was determined from the spectrum from the wave number range of from 1430 to 1100 cm$^{-1}$. The absorbance is measured as the height of the peak by selecting the so-called short or long base line or both. The short base line is drawn in about 1410-1320 cm$^{-1}$ through the minimum points and the long base line about between 1410 and 1220 cm$^{-1}$. Calibrations need to be done specifically for each base line type. Also, the comonomer content of the unknown sample needs to be within the range of the comonomer contents of the calibration samples.

Ethylene content in Polypropylene is measured with Fourier transform infrared spectroscopy (FTIR) calibrated with $^{13}$C-NMR. When measuring the ethylene content in polypropylene, a thin film of the sample (thickness about 250 mm) was prepared by hot-pressing. The area of absorption peaks 720 and 733 cm$^{-1}$ was measured with Perkin Elmer FTIR 1600 spectrometer. The method was calibrated by ethylene content data measured by $^{13}$C-NMR.

Quantification of Comonomer Content by $^{13}$C NMR Spectroscopy

The comonomer content was determined by quantitative nuclear magnetic resonance (NMR) spectroscopy after basic assignment (e.g. "NMR Spectra of Polymers and Polymer Additives", A. J. Brandolini and D. D. Hills, 2000, Marcel Dekker, Inc. New York). Experimental parameters were adjusted to ensure measurement of quantitative spectra for this specific task (e.g. "200 and More NMR Experiments: A Practical Course", S. Berger and S. Braun, 2004, Wiley-VCH, Weinheim). Quantities were calculated using simple corrected ratios of the signal integrals of representative sites in a manner known in the art.

The xylene solubles (XCS, wt.-%): Content of Xylene solubles (XCS) is determined at 23° C. according ISO 6427.

The gel content is assumed to be identical to the xylene hot insoluble (XHI) fraction, which is determined by extracting 1 g of finely cut polymer sample with 350 ml xylene in a Soxhlet extractor for 48 hours at the boiling temperature. The remaining solid amount is dried at 90° C. and weighed for determining the insolubles amount.

Strain Hardening Factor (SHF)

The strain hardening factor is defined as $$SHF = \frac{\eta_E^+(t,\dot{\varepsilon})}{\eta_{LVE}^+(t)} = \frac{\eta_E^+(t,\dot{\varepsilon})}{3\eta^+(t)}$$

wherein $\eta_E^+(t,\dot{\varepsilon})$ is the uniaxial extensional viscosity; and $\eta_{LVE}^+(t)$ is three times the time dependent shear viscosity $\eta^+(t)$ in the linear range of deformation.

The determination of the linear viscoelastic envelop in extension $\eta_{LVE}^+(t)$, using IRIS Rheo Hub 2008, required the calculation of the discrete relaxation time spectrum from the storage and loss modulus data (G', G'' (ω)). The linear viscoelastic data (G', G'' (ω)) is obtained by frequency sweep measurements undertaken at 180° C. for polypropylene or at 140° for polyethylene, on a Anton Paar MCR 300 coupled with 25 mm parallel plates. The underlying calculation principles used for the determination of the discrete relaxation spectrum are described in Baumgärtel M, Winter H H, "Determination of the discrete relaxation and retardation time spectra from dynamic mechanical data", Rheol. Acta 28:511519 (1989) which is incorporated by reference in its entirety.

IRIS RheoHub 2008 expresses the relaxation time spectrum as a sum of N Maxwell modes $$\overset{o}{G}(t) = G_e \cdot \sum_1^N g_i \cdot e^{-\frac{t}{\lambda_i}}$$

wherein $g_i$ and $\lambda_i$ are material parameters and $G_e$ is the equilibrium modulus.

The choice for the maximum number of modes, N used for determination of the discrete relaxation spectrum, is done by using the option "optimum" from IRIS RheoHub 2008. The equilibrium modulus $G_e$ was set at zero. The non-linear fitting used to obtain $\eta_{LVE}^+(t)$ is performed on IRIS Rheo Hub 2008, using the Doi-Edwards model.

The uniaxial extensional viscosity, $\eta_E^+(t,\dot{\varepsilon})$ is obtained from uniaxial extensional flow measurements, conducted on an Anton Paar MCR 501 coupled with the Sentmanat extensional fixture (SER-1). The temperature for the uniaxial extensional flow measurements was set at 180° C., applying extension (strain) rates a at ranging from 0.3 s$^{-1}$ to 10 s$^{-1}$ and covering a range of Hencky strain $$\varepsilon = \ln[(l-l_0)/l_0],$$

with $l_0$ being the original and l the actual sample fixation length, from 0.3 to 3.0. Particularly care was taken for the preparation of the samples for extensional flow. The samples were prepared by compression moulding at 230° C. followed by slow cooling to room temperature (forced water or air cooling were not used). This procedure allowed obtaining well shaped samples free of residual stresses. The sample was left for some minutes at the testing temperature to ensure thermal stability (set temperature ±0.1° C.), before carrying out the uniaxial extensional flow measurements.

LAOS Non-Linearity Factor (LAOS-NLF)

The investigation of the non-linear viscoelastic behavior under shear flow was done resorting to Large Amplitude Oscillatory Shear. The method requires the application of a sinusoidal strain amplitude, $\gamma_0$, imposed at a given angular frequency, $\omega$, for a given time, t. Provided that the applied sinusoidal strain is high enough, a non-linear response is generated. The stress, $\sigma$ is in this case a function of the applied strain amplitude, time and the angular frequency. Under these conditions, the non-linear stress response is still a periodic function; however, it can no longer be expressed by a single harmonic sinusoid. The stress resulting from a non-linear viscoelastic response [1-3] can be expressed by a Fourier series, which includes the higher harmonics contributions:

$$\sigma(t, \omega, \gamma_0) = \gamma_0 \cdot \sum_n [G'_n(\omega, \gamma_0) \cdot \sin(n\omega t) + G''_n(\omega, \gamma_0) \cdot \cos(n\omega t)]$$

wherein
$\sigma$ stress response
t time
$\omega$ frequency
$\gamma_0$ strain amplitude
n harmonic number
$G'_n$ n order elastic Fourier coefficient
$G''_n$ n order viscous Fourier coefficient The non-linear viscoelastic response was analysed applying Large Amplitude Oscillatory Shear (LAOS). Time sweep measurements were undertaken on an RPA 2000 rheometer from Alpha Technologies coupled with a standard biconical die. During the course of the measurement the test chamber is sealed and a pressure of about 6 MPa is applied. The LAOS test is done applying a temperature of 190° C., an angular frequency of 0.628 rad/s and a strain amplitude of 10. In order to ensure that steady state conditions are reached, the non-linear response is only determined after at least 20 cycles per measurement are completed. The Large Amplitude Oscillatory Shear Non-Linear Factor (LAOS-NLF) is defined by:

$$LAOS-NLF = \left|\frac{G'_1}{G'_3}\right|$$

wherein
$G'_1$ first order Fourier Coefficient
$G'_3$ third order Fourier Coefficient More details concerning the measurement are given in
1. J. M. Dealy, K. F. Wissbrun, Melt Rheology and Its Role in Plastics Processing: Theory and Applications; edited by Van Nostrand Reinhold, New York (1990)
2. S. Filipe, Non-Linear Rheology of Polymer Melts, AIP Conference Proceedings 1152, pp. 168-174 (2009)
3. M. Wilhelm, Macromol. Mat. Eng. 287, 83-105 (2002)
4. S. Filipe, K. Hofstadler, K. Klimke, A. T. Tran, Non-Linear Rheological Parameters for Characterisation of Molecular Structural Properties in Polyolefins, Proceedings of Annual European Rheology Conference, 135 (2010)

The documents (1) to (4) being incorporated by reference herewith.

$F_{30}$ Melt Strength

The test described herein follows ISO 16790:2005.

The strain hardening behaviour is determined by the method as described in the article "Rheotens-Mastercurves and Drawability of Polymer Melts", M. H. Wagner, Polymer Engineering and Science, Vol. 36, pages 925 to 935. The content of the document is incorporated by reference. The strain hardening behaviour of polymers is analysed by Rheotens apparatus (product of Göttfert, Siemensstr. 2, 74711 Buchen, Germany) in which a melt strand is elongated by drawing down with a defined acceleration.

The Rheotens experiment simulates industrial spinning and extrusion processes. In principle a melt is pressed or extruded through a round die and the resulting strand is hauled off. The stress on the extrudate is recorded, as a function of melt properties and measuring parameters (especially the ratio between output and haul-off speed, practically a measure for the extension rate). For the results presented below, the materials were extruded with a lab extruder HAAKE Polylab system and a gear pump with cylindrical die (L/D=6.0/2.0 mm) The gear pump was preadjusted to a strand extrusion rate of 5 mm/s, and the melt temperature was set to 200° C. The spinline length between die and Rheotens wheels was 80 mm. At the beginning of the experiment, the take-up speed of the Rheotens wheels was adjusted to the velocity of the extruded polymer strand (tensile force zero): Then the experiment was started by slowly increasing the take-up speed of the Rheotens wheels until the polymer filament breaks. The acceleration of the wheels was small enough so that the tensile force was measured under quasi-steady conditions. The acceleration of the melt strand drawn down is 120 mm/sec$^2$. The Rheotens was operated in combination with the PC program EXTENS. This is a real-time data-acquisition program, which displays and stores the measured data of tensile force and drawdown speed. The end points of the Rheotens curve (force versus pulley rotary speed) is taken as the $F_{30}$ melt strength and drawability values.

Grammage of the Nonwoven Fabric, the Web, and the Coating Layer

The unit weight (grammage) of the webs in g/m$^2$ was determined in accordance with ISO 536:1995.

Average Fibre Diameter in the Web

The number average fibre diameter was determined using scanning electron microscopy (SEM). A representative part of the web was selected and an SEM micrograph of suitable magnification was recorded, then the diameter of 20 fibres was measured and the number average calculated.

Water vapor transmission rates (WVTR) are determined under tropical conditions (23° C., 85% rel humidity) according to ISO 15106-3 on 350 μm thick samples.

Hydrohead

The hydrohead or water resistance as determined by a hydrostatic pressure test is determined according to the WSP (wordwide strategic partners) standard test WSP 80.6 (09) as published in December 2009. This industry standard is in turn based on ISO 811:1981 and uses specimens of 100 cm² at 23° C. with purified water as test liquid and a rate of increase of the water pressure of 10 cm/min.

Medium particle size was measured according to the sedimentation method. The sedimentation method is an analysis of sedimentation behaviour in a gravimetric field. The measurement is made with a Sedigraph™ 5100 of Micromeritics Instrument Corporation. The method and the instrument are known to the skilled person and are commonly used to determine grain size of fillers and pigments. The measurement is carried out in an aqueous solution of 0.1 wt % $Na_4P_2O_7$. The samples were dispersed using a high speed stirrer and supersonic.

Tensile Modulus, tensile stress at yield, tensile strain at yield, tensile strenght: in machine and transverse direction were determined according to ISO 527-3 on coated webs with a thickness of 350 μm at a cross head speed of 1 mm/min.

Ash content: Ash content is measured according to ISO 3451-1 (1997) standard.

B. EXAMPLES

TABLE 1

Properties in machine direction

| No | Coating | Side | Weight [g/m²] | Press roll [kp/cm²] | TM [MPa] | TSTY [MPa] | TSRY [%] | TS [MPa] |
|---|---|---|---|---|---|---|---|---|
| E1 | PE-2 | Belt | 5 | 2.8 | 157.01 | 3.21 | 2.47 | 3.2 |
| E2 | PE-2 | Air | 5 | 2.8 | 156.54 | 3.15 | 2.29 | 3.13 |
| E3 | PE-2 | Air | 15 | 2.8 | 185.09 | 3.97 | 2.64 | 3.93 |
| E4 | PE-2 | Air | 15 | 1 | 169.89 | 3.68 | 2.65 | 3.69 |
| E5 | PP-2 | Belt | 4 | 2.8 | 160.34 | 3.42 | 2.66 | 3.43 |
| E6 | PP-2 | Air | 4 | 2.8 | 172.2 | 3.49 | 2.19 | 3.54 |
| E7 | PP-2 | Air | 7 | 2.8 | 187.1 | 3.76 | 2.13 | 3.75 |
| CE1 | Web | | | | 163.83 | 3.09 | 2.14 | 3.02 |

TABLE 2

Properties in transverse direction

| No | Coating | Side | Weight [g/m²] | Press roll [kp/cm²] | TM [MPa] | TSTY [MPa] | TSRY [%] | TS [MPa] |
|---|---|---|---|---|---|---|---|---|
| E1 | PE-2 | Belt | 5 | 2.8 | 59.79 | 1.32 | 3.08 | 1.32 |
| E2 | PE-2 | Air | 5 | 2.8 | 57.79 | 1.26 | 2.59 | 1.26 |
| E3 | PE-2 | Air | 15 | 2.8 | 74.17 | 1.78 | 3.91 | 1.78 |
| E4 | PE-2 | Air | 15 | 1 | 76.73 | 1.76 | 3.5 | 1.76 |
| E5 | PP-2 | Belt | 4 | 2.8 | 65.34 | 1.44 | 2.96 | 1.44 |
| E6 | PP-2 | Air | 4 | 2.8 | 68.7 | 1.48 | 2.77 | 1.48 |
| E7 | PP-2 | Air | 7 | 2.8 | 76.76 | 1.71 | 2.86 | 1.71 |
| CE1 | Web | — | — | — | 59.55 | 1.17 | 2.23 | 1.17 |

TABLE 3

Barrier Properties

| No | Coating | Side | Weight [g/] | Press roll [kp/cm²] | WVTR [g/m²/24h] | HH [cm H₂O] |
|---|---|---|---|---|---|---|
| E1 | PE-2 | Belt | 5 | 2.8 | 17.3 | >1000 |
| E2 | PE-2 | Air | 5 | 2.8 | 16.4 | >1000 |
| E3 | PE-2 | Air | 15 | 2.8 | 4.72 | >1000. |
| E4 | PE-2 | Air | 15 | 1 | 4.75 | >1000 |
| E5 | PP-2 | Belt | 4 | 2.8 | 12.1 | >1000 |
| E6 | PP-2 | Air | 4 | 2.8 | 12.7 | >1000 |
| E7 | PP-2 | Air | 7 | 2.8 | 7.85 | >1000 |
| CE1 | Web | — | 0 | — | n.m. | 103 |

TM Tensile modulus
TSTY Tensile stress at yield
TSRY Tensile strain at yield
TS Tensile strength
Belt Coating on belt side of melt blown web
Air Coating on air side of melt blown web
WVTR Water vapour transmission rate
HH Hydrohead
n.m. not measured Web has been obtained as follows: The commercial PP homopolymer HL508FB as described below has been converted into a melt blown web on a 250 mm wide Reicofil melt blown pilot line using a die with holes of 0.4 mm diameter and 35 holes per inch. The melt temperature was set at 290° C. and the air temperature at 270° C. The output of the line was 30 kg/m/h, the distance from die to collector was fixed at 180 mm and the webs produced had a weight of 70 g/m².

PP is the commercial propylene homopolymer Borflow™ HL508FB (Borealis) having an $MFR_2$ of 800 g/10 min produced in a visbreaking process. This polymer is characterized by a melting point Tm of 161° C. and a heat of fusion of 102.4 J/g as determined by DSC, a tensile modulus of 1100 MPa as determined on injection-molded specimens and an XCS content of 1.9 wt.-%. The molecular weight distribution of this polymer as determined by SEC is characterized by a weight average molecular weight Mw of 77 kg/mol and a broadness Mw/Mn of 3.0.

PE-2 is the commercial ethylene homopolymer CA9150 of Borealis AG with following properties: The low density polyethylene has a density of 915 kg/m³, an MFR (190° C./2.16 kg) of 15 g/10 min, a melting point Tm according to DSC of 105° C. and the following rheological properties in extension: strain-hardening factor SHF (140° C.) of 4.09 at a strain rate of 3 $s^{-1}$ and a Hencky strain of 2.5 and SHF (140° C.) of 2.33 at a strain rate of 1 $s^{-1}$ and a Hencky strain of 2.0, LAOS-NLF (200° C.) of 2.14 and Rheotens $F_{30}$ of 4.1 cN. The ash content of the polymer is less than 0.01 wt %.

PP-2 is the commercial HMS-PP homopolymer WF420HMS of Borealis AG with following properties: The reactively modified high melt strength polypropylene has a density of 905 kg/m³, an MFR (230° C./2.16 kg) of 22 g/10 min, a melting point Tm according to DSC of 164° C. and the following rheological properties in extension: strain-hardening factor SHF (180° C.) of 2.03 at a strain rate of 3 $s^{-1}$ and a Hencky strain of 2.5 and SHF (180° C.) of 1.58 at a strain rate of 1 $s^{-1}$ and a Hencky strain of 2.0, LAOS-NLF (200° C.) of 2.63 and Rheotens $F_{30}$ of 4.0 cN. The ash content of the polymer is less than 0.2 wt %.

The invention claimed is:
1. Composite comprising:
   (a) a nonwoven fabric (NF) being the substrate of the composite, said nonwoven fabric (NF) comprises a polymer (P-1) selected from the group consisting of polyethylene (PE-1), polypropylene (PP-1), polyethylene terephthalate (PET) and polyamide (PA), and (b) a coating layer (CL) overlaying at least one surface of the nonwoven fabric (NF), said coating layer (CL) comprises a polymer (P-2) being a polypropylene (PP-2), wherein the coating layer (CL) and/or the polymer (P-2) has (have):

(i) a branching index g' of equal or below 0.9, and optionally (ii) a strain hardening factor (SHF) of at least 2.0 measured at a strain rate of 3.0 s-1 and a Hencky strain of 2.5, wherein the coating layer (CL) has an average thickness of 2.0 to 25 μm and is free of pores, and the polymer (P-2) is the only polymer within the coating layer (CL).

2. Composite according to claim 1, wherein the coating layer (CL) and/or the polymer (P-2) has (have), (a) a strain hardening factor (SHF) of at least 1.5 measured at a strain rate of 1.0 s-1 and a Hencky strain of 2.0, and/or (b) a LAOS non-linearity factor (LAOS-NLF) measured according to the LAOS method of at least 2.5, and/or (c) a F30 melt strength of at least 3.0 cN at 200° C. determined by the Rheotens test.

3. Composite according to claim 1, wherein the polymer (P-2) is (a) a polypropylene (PP-2) having a melt flow rate MFR2 (230° C.) measured according to ISO 1133 of at least 15.0 g/10 min.

4. Composite according to claim 1, wherein the coating layer (CL) (a) is non-stretched, and/or (b) has a weight per unit area of equal or below 20 g/m2.

5. Composite according to claim 1, wherein the nonwoven fabric (NF) has a weight per unit area at least 15 g/m2.

6. Composite according to claim 1, wherein the nonwoven fabric (NF) is a melt blown web.

7. Composite according to claim 1, wherein the nonwoven fabric (NF) is a spunbonded fabric.

8. Composite according to claim 1, wherein the polypropylene (PP-1) is a propylene homopolymer (H-PP-1).

9. Composite according to claim 1, wherein no adhesive (A) between the coating layer (CL) and the nonwoven fabric (NF) is present.

10. Composite according to claim 1, wherein the coating layer (CL) is an extrusion coating layer.

11. Process for the preparation of a composite as defined in claim 1 comprising the steps of:
(a) extruding the polymer (P-2) and
(b) coating the nonwoven fabric (NF) comprising the polymer (P-1) with the extruded polymer (P-2).

* * * * *